United States Patent
Pieri

(10) Patent No.: US 10,082,380 B2
(45) Date of Patent: Sep. 25, 2018

(54) TOOL FOR MEASURING RADIAL STACKING ANGLE OF BLADES, MEASURING METHOD AND BLADE

(71) Applicant: Nuovo Pignone Srl, Florence (IT)

(72) Inventor: Marco Pieri, Florence (IT)

(73) Assignee: Nuovo Pignone SRL, Florence (IT)

( * ) Notice: Subject to any disclaimer, the term of this patent is extended or adjusted under 35 U.S.C. 154(b) by 323 days.

(21) Appl. No.: 15/100,043

(22) PCT Filed: Nov. 28, 2014

(86) PCT No.: PCT/EP2014/075900
§ 371 (c)(1),
(2) Date: May 27, 2016

(87) PCT Pub. No.: WO2015/079007
PCT Pub. Date: Jun. 4, 2015

(65) Prior Publication Data
US 2017/0003109 A1    Jan. 5, 2017

(30) Foreign Application Priority Data
Nov. 28, 2013 (IT) .............................. CO2013A0063

(51) Int. Cl.
*G01B 5/20* (2006.01)
*G01B 5/24* (2006.01)

(52) U.S. Cl.
CPC ............... *G01B 5/205* (2013.01); *G01B 5/24* (2013.01)

(58) Field of Classification Search
CPC .................................. G01B 5/205; G01B 5/24

USPC .......................................................... 33/534
See application file for complete search history.

(56) References Cited

U.S. PATENT DOCUMENTS 2,358,987 A * 9/1944 MacKay ................ G01B 5/205
33/530
4,333,239 A * 6/1982 Arrigoni ................ G01B 5/205
33/535

(Continued)

FOREIGN PATENT DOCUMENTS

| CN | 87106358 A | 6/1988 |
|---|---|---|
| CN | 88103005 A | 12/1988 |
| EP | 2019185 A2 | 1/2009 |

OTHER PUBLICATIONS

First Office Action and Search issued in connection with corresponding CN Application No. 201480065375.4 dated Mar. 5, 2018.

(Continued)

*Primary Examiner* — Yaritza Guadalupe-McCall
(74) *Attorney, Agent, or Firm* — GE Global Patent Operation; Marc A. Vivenzio

(57) ABSTRACT

A tool to measure the radial stacking angle of a cylindrical blade comprises a base configured to indicate a radial direction of the hub, a component slidable over the blade and configured to indicate the stacking direction of the cylindrical blade, reference elements to provide a reference scale, a setting element configured to set the position of the component with respect to the base, a marker element configured to indicate the magnitude of the angle between the stacking direction and the radial direction using the reference elements; the angle corresponds to the radial stacking angle.

15 Claims, 8 Drawing Sheets

(56) References Cited

U.S. PATENT DOCUMENTS

| | | | |
|---|---|---|---|
| 4,411,073 A | 10/1983 | Ryan | |
| 4,987,555 A | 1/1991 | Twerdochlib | |
| 5,133,643 A * | 7/1992 | Ortolano | F01D 5/225 |
| | | | 269/43 |
| 5,624,231 A * | 4/1997 | Ohtomo | F01D 5/186 |
| | | | 415/115 |
| 6,931,751 B2 * | 8/2005 | LaTulippe | B25B 5/003 |
| | | | 269/153 |
| 8,127,581 B2 * | 3/2012 | Davis | B23P 6/002 |
| | | | 269/291 |
| 8,196,305 B1 * | 6/2012 | Hansen | G01B 5/0004 |
| | | | 33/530 |
| 9,109,873 B1 * | 8/2015 | Lewis | G01B 3/20 |
| 9,151,587 B2 * | 10/2015 | Ward, Jr. | F01D 25/285 |
| 2004/0139809 A1 * | 7/2004 | Soechting | F01D 21/003 |
| | | | 73/865.9 |
| 2005/0207893 A1 * | 9/2005 | Chandraker | F01D 5/141 |
| | | | 416/223 R |
| 2008/0209747 A1 | 9/2008 | Chang | |
| 2016/0222786 A1 * | 8/2016 | Kuwabara | F01D 9/02 |
| 2017/0003109 A1 * | 1/2017 | Pieri | G01B 5/205 |

OTHER PUBLICATIONS

Italian Search Report issued in connection with corresponding patent application CO2013A000063 dated Feb. 13, 2014.
International Search Report and Written Opinion issued in connection with corresponding PCT application PCT/EP2014/075900 dated Mar. 10, 2015.

* cited by examiner

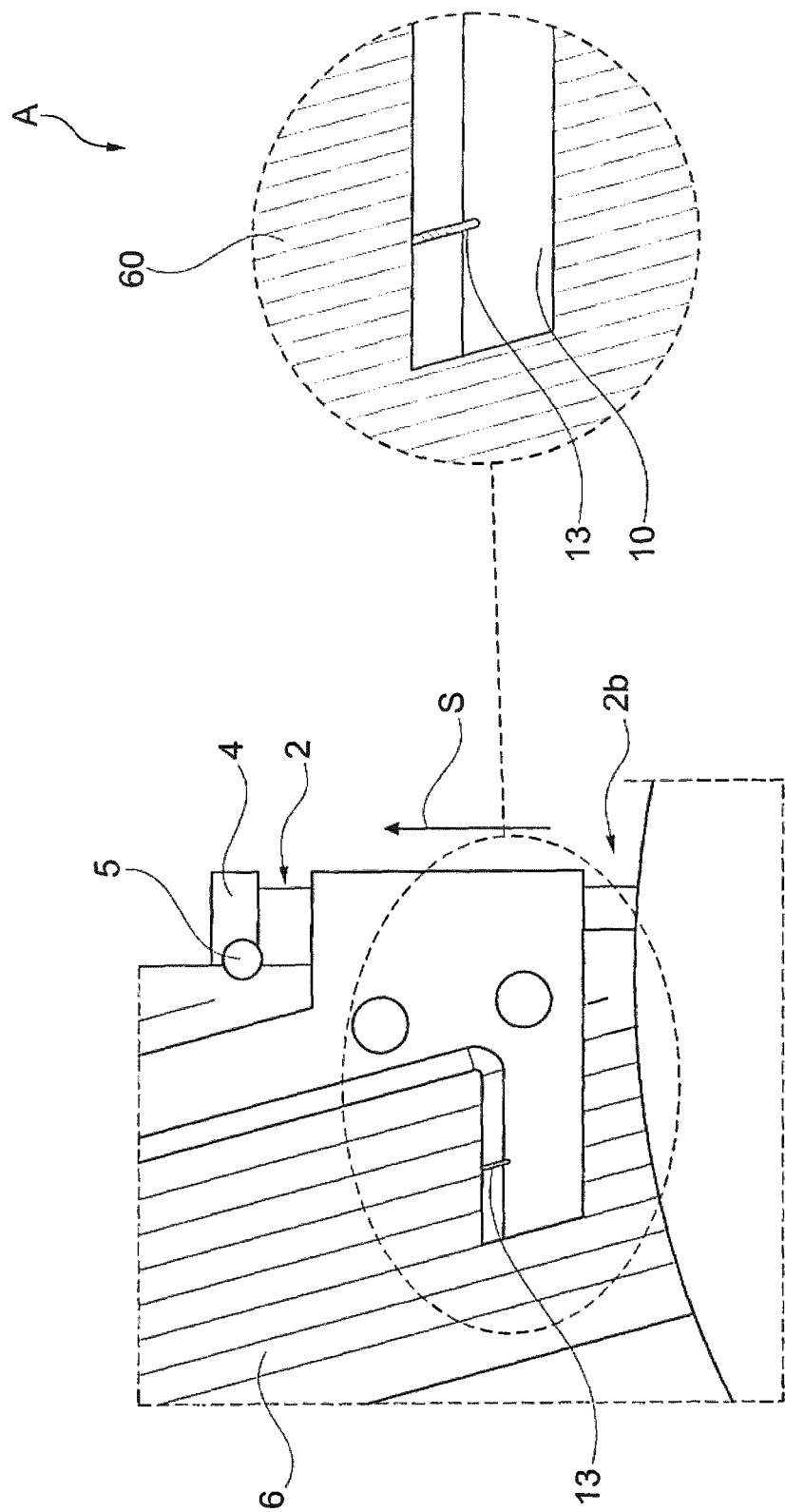

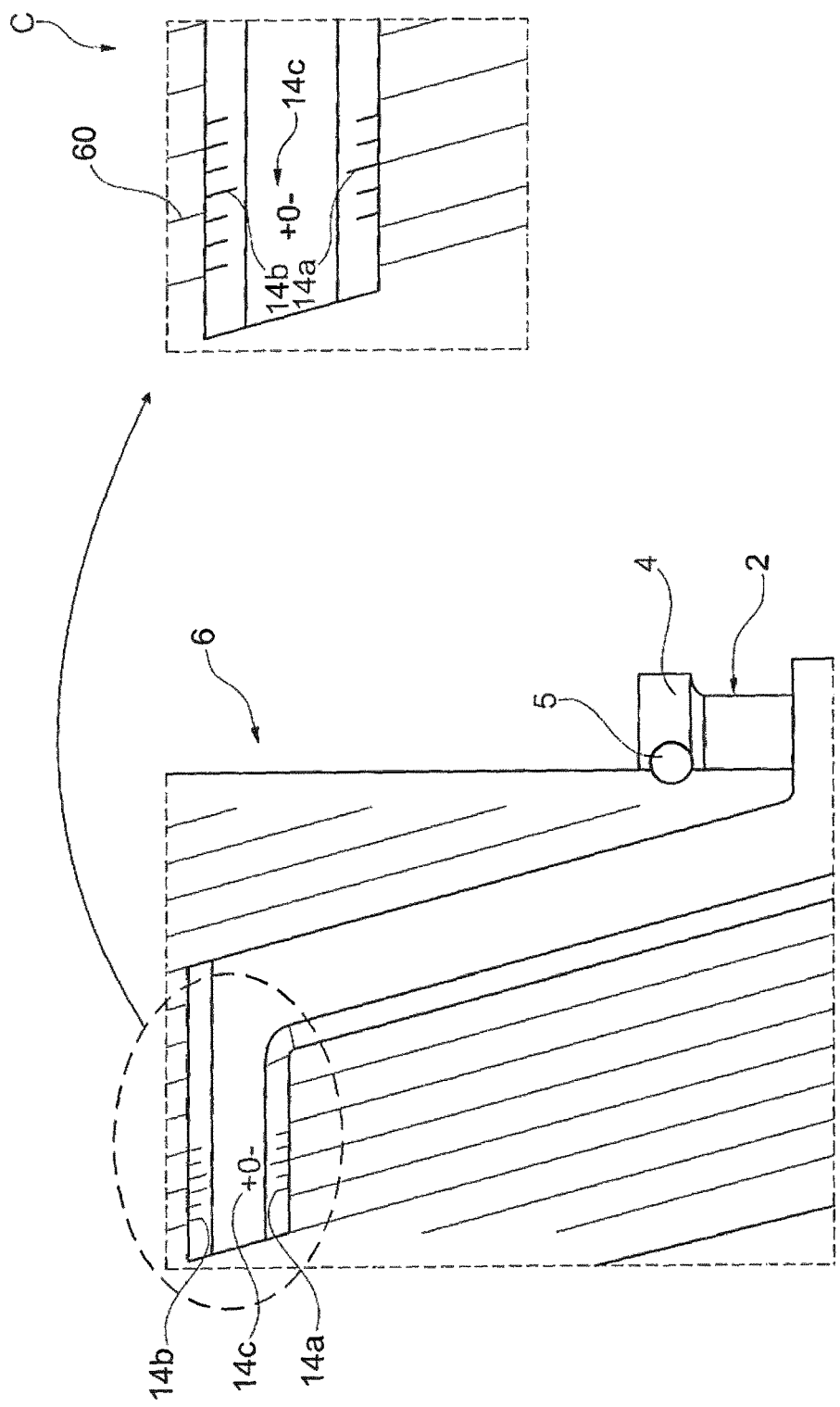

TOOL FOR MEASURING RADIAL STACKING ANGLE OF BLADES, MEASURING METHOD AND BLADE

BACKGROUND

Embodiments of the present invention relate in general to radial stacking angle measurement for blades.

The term "stacking axis" should be known to the persons skilled in the art; anyway, for the sake of completeness, a definition is set out in the following. A rotating blade of a rotary machine, in particular a turbo machine, may be considered as the combination of a plurality of blade sections stacked one on top of the other in a radial direction that is perpendicular to the rotation axis. The line connecting the centers of gravity of each section defines the stacking axis.

Other elements of the blade are the leading edge that is the front part of the airfoil and the trailing edge that is the rear part of the airfoil. The blade extends radially outwardly from the root, at a first end close to the hub (often adjacent to the hub), to the shroud, at a second end remote from the hub. The radial axis is the axis outwardly extending from the center of the hub. The stacking axis of a so-called cylindrical blade should typically coincide with the radial axis. However, tolerance of the machines used for manufacturing of the blades and forcing of the blade during the process of assembly may cause an out-of-radiality stacking of a blade.

FIGS. 1A and 1B shows two different types of out-of-radiality stacking. In FIG. 1A, due to tolerances in manufacturing procedure of the shroud 4 of the blade 1, there is an excess of material of the shroud itself. This situation can occur, e.g., if the angle by which the shroud is manufactured is slightly greater than the project one. The radial axis is indicated with the reference R, whilst the stacking axis is indicated with the reference S. The two axes are misaligned, whilst, as said, should coincide. Therefore, in the case of FIG. 1A it is necessary to correct this defect, e.g. milling the shroud to give it the correct angle.

FIG. 1B shows a blade affected by an out-of-radiality stacking occurred by a wrong (due to tolerances) manufacture of the root 18. This condition creates a misalignment of the stacking axis S with respect to the radial axis R. It worth noting that in the case of FIG. 1B the misalignment of the two axes is opposite with respect to the case of FIG. 1A.

Consequently, centrifugal stresses, due to misalignments to which a blade is subject, can be substantial, producing considerable wear. The design of a blade tends to an increase in the life time. In machines having blades with radially directed straight stacking axis, if the radial parallelism is not correct, the design stresses of the blade can increase, and the safety coefficient can be lowered.

Therefore, it is important to measure the angular amount of the stacking in order to perform the necessary corrections. For this type of measurements, it is known to use only one simple radial ruler; anyway, such ruler can be used only with blades having one parallel-to-radial tangential side because the reference radial vector can be found and depicted on the blade. Furthermore, such ruler does not give a quantitative value of the out-of-radiality stacking, but rather only a qualitative estimation, since the measurement is performed only by eyes without the help of a measurement scale. Until today tools or methods for quantitative measurements of the angular amount of the stacking, when blades have no any parallel to radial tangential side, are not available.

Therefore, there is a need for providing a tool for measuring quantitatively radial stacking angle of blades, in particular for any shape of the blade.

SUMMARY OF THE INVENTION

By measuring the out of radiality, providing both a measuring tool and corresponding measuring method of the stacking axis of a straight blade in a simple and reliable manner, it is possible perform the necessary corrections to the blade right way.

According to first exemplary embodiments, there is tool to measure the radial stacking angle of a cylindrical blade of an axial flow rotating machine; the blade extends radially outwardly from the surface of a hub; the tool comprises: a base configured to indicate a radial direction of the hub; a component slidable over the blade and configured to indicate the stacking direction of the cylindrical blade; reference elements to provide a reference scale; a setting element configured to set the position of the component with respect to the base; a marker element configured to indicate the magnitude of the angle between the stacking direction and the radial direction using the reference elements; this angle corresponds to the radial stacking angle.

According to second exemplary embodiments, there is a method to measure the radial stacking angle of a cylindrical blade of an axial flow rotating machine using a tool; the blade extends radially outwardly from the surface of a hub; according to this method, first component of the tool is arranged according to a radial direction, then a second component of the tool is arranged according to the stacking direction of the blade, and finally the relative position of the first and second components is detected.

According to third exemplary embodiments, there is a cylindrical blade of a rotating machine comprising a shroud, wherein the shroud has at least one hole (in particular a blind hole) or at least one pin (in particular a projecting pin) for receiving means to indicate a radial reference on the cylindrical blade; the hole or pin are designed to cooperate with a tool to measure the radial stacking angle of the cylindrical blade.

BRIEF DESCRIPTION OF THE DRAWINGS

The present invention will become more apparent from the following description of exemplary embodiments to be considered in conjunction with accompanying drawings wherein:

FIG. 7 shows a tool to measure the radial stacking angle in a second position to carry out a second measurement step;

FIG. 8 shows the tool in the second position of FIG. 7, but to carry out a third measurement step.

DETAILED DESCRIPTION

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 4:
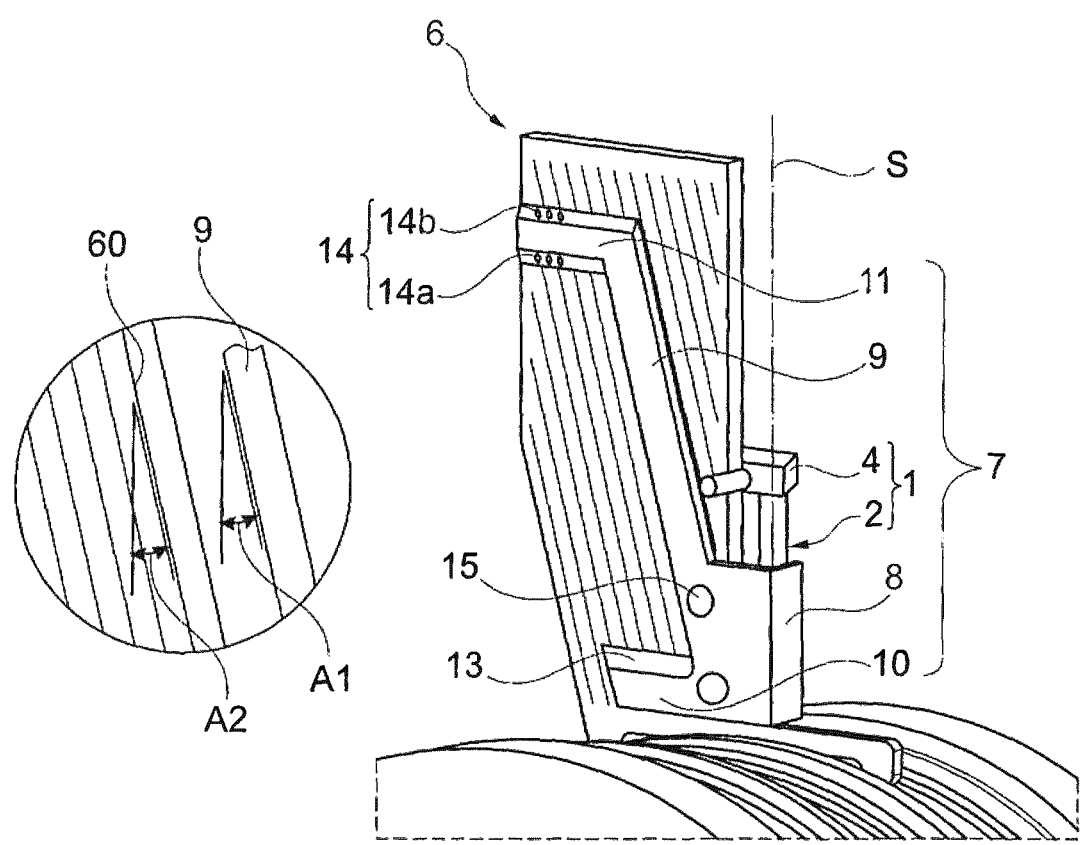
FIG. 4 shows a first embodiment of a tool to measure the radial stacking angle.
Figure 5:
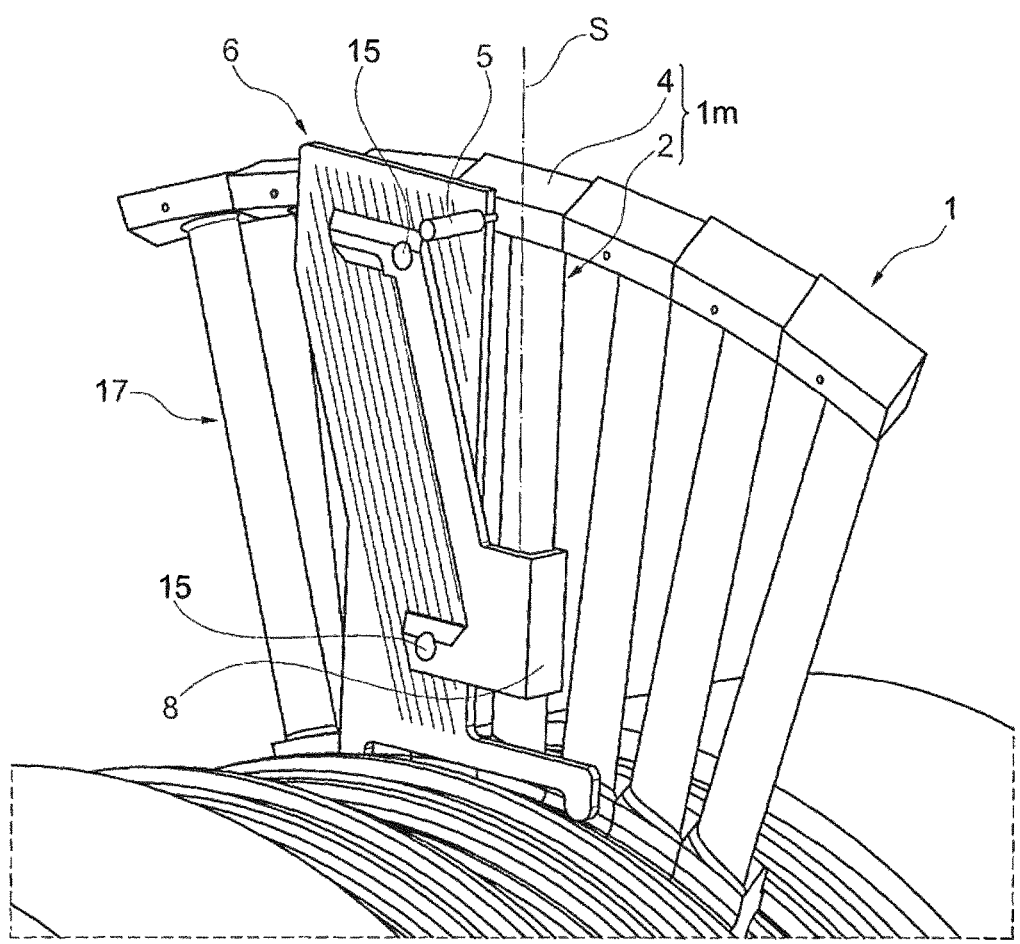
FIG. 5 shows a second embodiment of a tool to measure the radial stacking angle.

An embodiment of a tool to measure the radial stacking angle comprises a radial ruler 6 and a measurement ruler 7, as shown in FIGS. 4 and 5. The further figures show enlarged views of the parts of the tool, in particular during a measuring procedure.

Figure 1A:
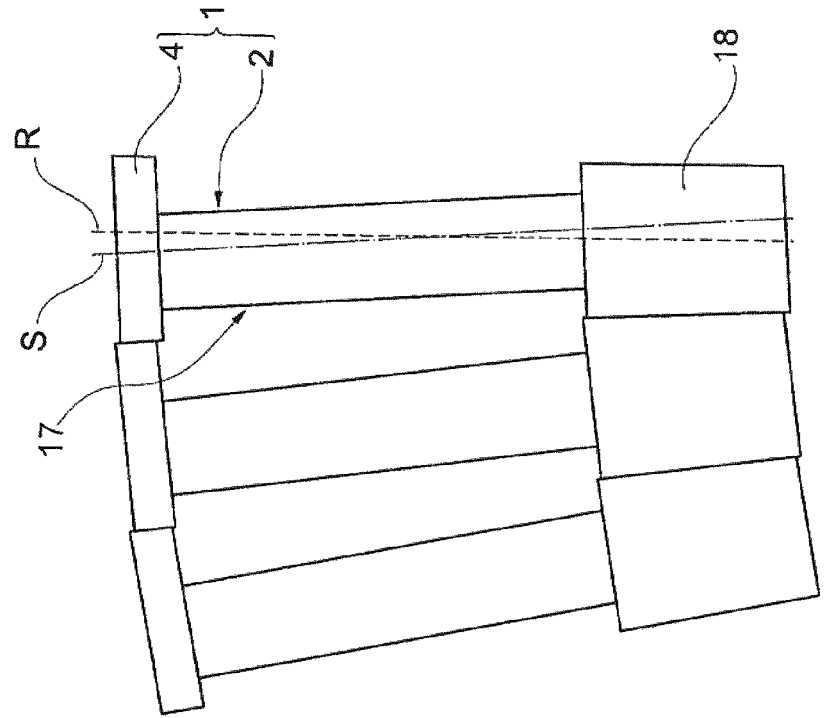
FIG. 1A shows a blade affected by a first type of out-of-radiality stacking.
Figure 1B:
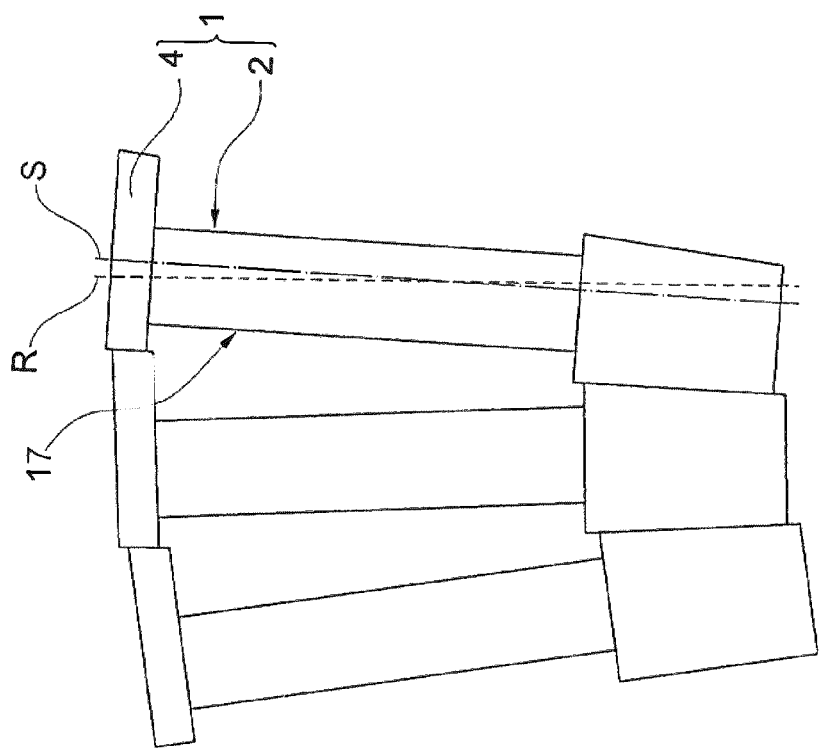
FIG. 1B shows a blade affected by a second type of out-of-radiality stacking.
Figure 2:
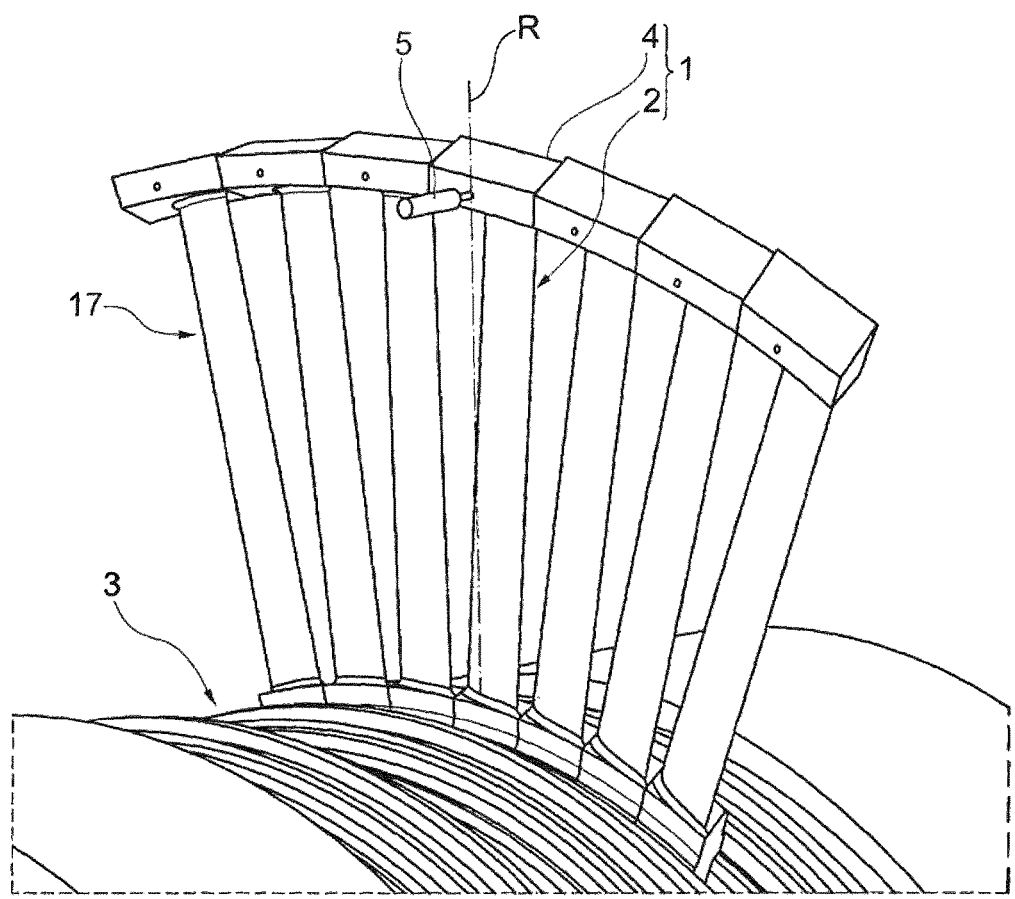
FIG. 2 shows a portion of a hub with cylindrical blades, in which one blade is provided with a pin inserted in the shroud to measure the radial stacking angle.

FIG. 2 shows a plurality of cylindrical blades 1 radially extending from the hub 3. Each blade extends from a dovetail 18, at the hub 3, to a shroud 4. The reference 2 indicates the trailing edge of the (and each) blade 1 and the reference 17 indicates the leading edge of the (and each) blade 1. A reference is created on the shroud 4 of the blade. Said reference defines the radial axis R extending from the hub 3 and passing to the blade 1. In one embodiment, this reference is obtained with a blind hole drilled on the face of the shroud 4 that lays on a normal plane in respect of the plane in which the blade lays. Thus, the angle between the stacking axis of the blade in respect of the radial axis R can be measured. In one embodiment, a pin 5 is inserted into the hole in the shroud 4. Thus, the radial axis R passes for the pin 5. In this way, it is possible to find the stacking axis S of the blade 1 with reference to the axis R, and thus calculate the amount of the angle between these two axis.

Figure 3:
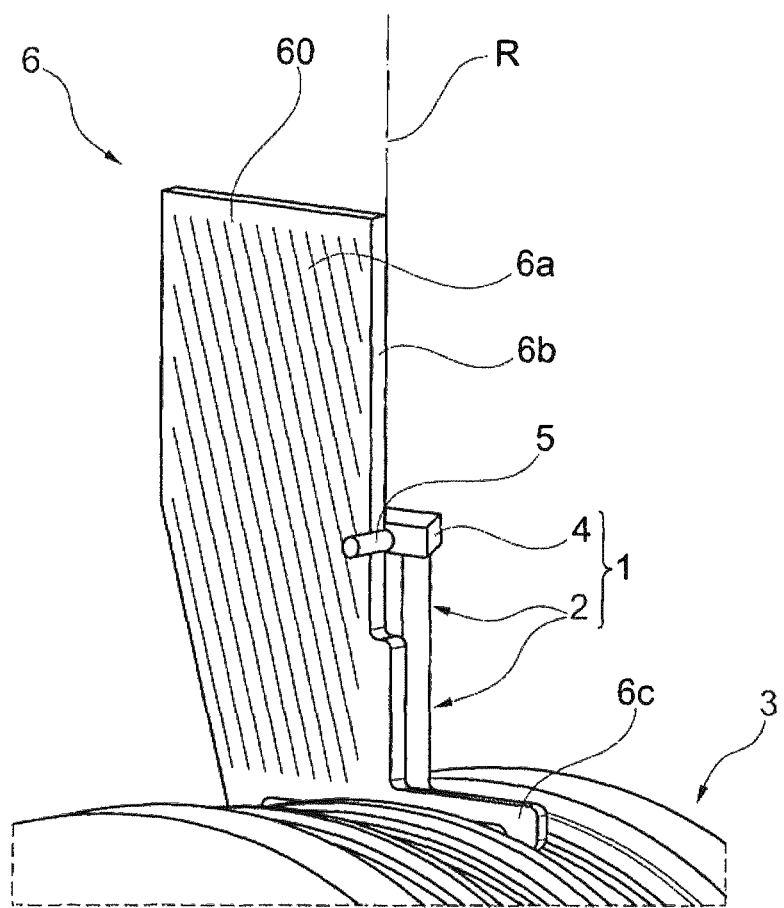
FIG. 3 shows some components of a tool to measure the radial stacking angle.

FIG. 3 shows a radial ruler 6 in a measurement position. In this position, it lays on the surface of the hub 3 and is in contact with said pin 5. In one embodiment, the radial ruler 6 comprises a flat body 6A attached to a base 6C. The flat body 6A is perpendicular (in the direction of the radial axis R) to the base 6c. The radial ruler 6 lays on the hub 3 by mean of the base 6C. In one embodiment, the base 6C is configured to be in tangential contact with the cylindrical surface of the hub 3, and laying on the hub 3 in a stable manner. Furthermore, (as more visible in FIG. 5) the base 6C has an elongated shape along a longitudinal axis, and its shape is symmetric with respect to a plane perpendicular to the longitudinal axis at its central point. At two respective opposite ends of the base 6C, are present two projecting elements in the form of two feet. The base 6C is in contact with the hub 3 by mean of these two feet. In this way, each measurement position of the radial ruler 6 on the hub 3 individuates the radial axis R.

The body 6A of the radial ruler 6 extends vertically on a plane perpendicular with respect to the longitudinal axis of the base 6C, and has a substantially flat shape. The body 6A comprises a side edge 6B that enters in contact with the pin 5. The side edge 6B is perpendicular with respect to the base 6A, and identifies a radial axis extending from the hub 3. When the radial ruler 6 is put in contact with the pin 5, the line of the side edge 6B in contact with the pin 5 identifies the radial axis R that should correspond with the stacking axis of the blade under measure.

In the measurement position, the radial ruler 6 is in contact with the pin 5 and with the hub 3, but it is not in direct contact with the airfoil of the blade 1. In one embodiment, the flat body 6A is provided with a plurality of parallel lines 60 inclined with respect to the radial direction. These parallel lines 60 can be drawn on the surface of the flat body 6A, or milled on the same.

FIG. 4 shows a measuring tool, with the radial ruler 6 and the measurement ruler 7 mounted on the hub 3 and on the blade 1 respectively. For the sake of simplicity, in FIG. 4 only one blade 1 is shown; typically, more than one blade is present on the hub 3. The measurement ruler 7 is in contact with the trailing edge 2 of the blade 1, and lays on the radial ruler 6. The measurement ruler 7 comprises a second segment located in its lowermost region; the segment comprises a first reference portion 10 having a reference mark 13 that is used to set the position of the measurement ruler 7 with respect to the radial ruler 6.

In one embodiment, the measurement ruler 7 comprises a second reference portion 11, in turn comprising two parallel sides, wherein a marker element 14 with two marks has respectively a first graduate scale 14A and a second graduate scale 14B one shifted with respect to the other according to the inclination of the first segment 9. In one embodiment, the first graduate scale 14A is adapted to indicate the integer value of the radial stacking angle, and the second graduate scale 14B is adapted to indicate the decimal value of the radial stacking angle. Furthermore, the measurement ruler 7 is provided with a sign reference 14C on the second reference portion 11 in relation with said two graduate scales 14A, 14B and is adapted to indicate the sign of the value indicated by said graduate scales 14A, 14B. The marker element 14 with its marks is to be aligned with the reference mark 13.

In one embodiment, the measurement ruler 7 further comprises: a first side 8 adapted to be in abutment against the trailing edge 2 of the blade 1; at a first lower end, a first reference portion 10; at a second upper end a second reference portion 11; a junction portion 9 that joins the first reference portion 10, the second reference portion 11 and the first side 8. The first side 8 extends vertically in the same direction of the blade 1. The junction portion 9 extends according to an inclined direction parallel to the lines 60. As shown in the enlarged view A of FIG. 4, the junction portion 9 is inclined of an angle A1, and the lines 60 are in turn inclined of an angle A2. The angle A1 and angle A2 are equal. This angle can be in a wide range, according to construction requirements of the tool, and to the specific geometry of the blade.

The first reference portion 10 and the second reference portion 11 extend horizontally, in a way substantially perpendicular with respect to the direction of the first side 8. In an embodiment, the face of the first side 8 in abutment against the trailing edge 2 has a flat shape; in this way there is a full contact between the first side 8 and the trailing edge 2.

The measurement ruler 7 is in contact with the trailing edge 2 of the blade 1 by mean of the first side 8, and is reversibly fastened to the radial ruler 6. In particular, the measurement ruler 7 is reversibly fastened to the body 6a of the radial ruler 6. In one embodiment, the measurement ruler 7 comprises a couple of magnets 15 at his lower end, to realize the reversible fastening. A reference mark 13 is realized on the first reference portion 10 of the measurement ruler 7. The reference mark 13 is adapted to determine the right alignment of the measurement ruler 7 with the parallel lines 60 and thus determine the amount of the stacking angle of the blade 1, as will be clearer afterwards. In one embodiment, the reference mark 13 is a line realized by drawing or milling with the same inclination angle of the lines 60 on the radial ruler 6 and of the junction portion 9 (i.e. the angles A1 and A2).

A measurement scale 14 is realized on the second reference portion 11. The measurement scale 14 is adapted to determine the amount of the stacking angle of the blade 1. In one embodiment, said scale 14 comprises a first scale 14A, adapted to furnish the integer part of the stacking angle, and a second scale 14B adapted to furnish the decimal part of the stacking angle. The stacking angle, both the integer part and decimal part, is measured referring to the parallel lines 60, as will be clearer afterwards.

Thus, in one embodiment, the complete reading of the stacking angle is obtained reading the first scale 14A for the integer part, and the second scale 14B for the decimal part.

As said, the measurement ruler 7 is reversible fastened to the radial ruler 6 and, with his first side 8, is in abutment against the trailing edge 2 of the blade 1. This configuration allows the measurement ruler 7 to be movable along the stacking axis S of the blade 1, and thus measure, with respect to the line 60 on the radial ruler 6, the amount of the stacking angle.

FIG. 5 shows a further embodiment of a tool to measure the radial stacking angle. As visible, a plurality of blades 1 are represented in the figure. The tool is designated to measure the stacking angle of one blade (of the plurality) per time. It worth noting that the blades neighbor to the blade under measure (indicated with reference lm in figure) do not interfere with the measurement procedure. In fact, the tool and the blades 1 extend vertically along two parallel and distanced planes, in turn perpendiculars to the hub rotation axis. In this way the operations carried out to perform the measurement, namely put the radial ruler 6 on the surface of the hub 3, and fix the measurement ruler to the radial ruler 6 and in contact with the trailing edge 2 in proper way, are not impaired the neighbor blades.

The embodiment of FIG. 5 differs from the embodiment of FIG. 4 for a different arrangement the magnets 15. In this embodiment, a first magnet is inserted in the first reference portion 10, and a second magnet is inserted on the second reference portion 11. In this way, the fastening occurs for the whole length of the measurement ruler. This configuration can be particularly beneficial in case of tool of a big size, adapted to measure the stacking angle of corresponding blades of big size.

Figures from 6 to 8 show an embodiment of the tool to measure the radial stacking angle in different positions in order to explain the steps of a measurement method of the radial stacking angle of the blade 1.

Figure 6:
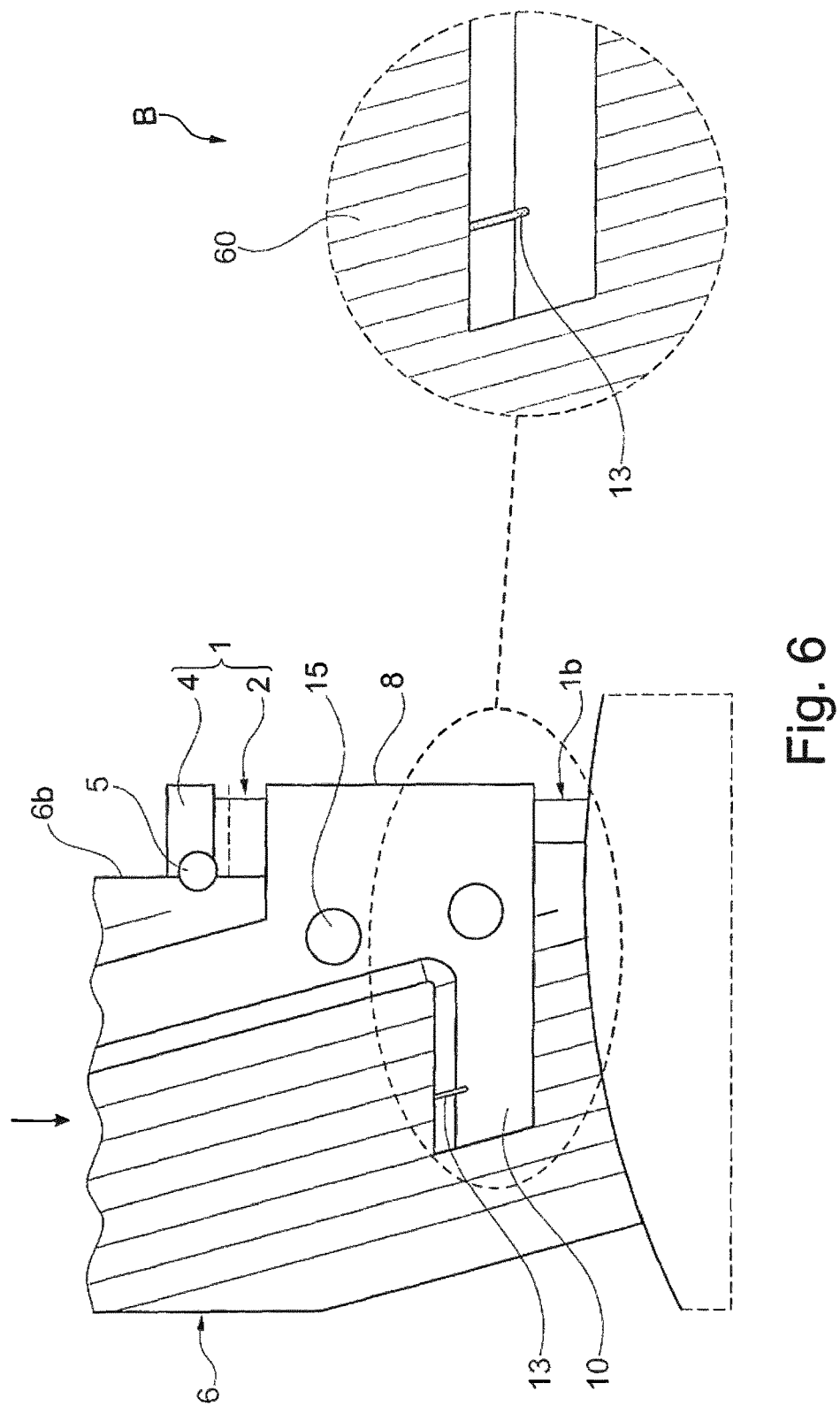
FIG. 6 shows a tool to measure the radial stacking angle in a first position to carry out a first measurement step.

FIG. 6 shows the tool to measure the radial stacking angle in the first position.

The operator identifies the blade to measure, i.e. blade 1 in FIG. 6; put the pin 5 on the hole of the shroud 4; then mounts the radial ruler 6 on the hub 3 so that the edge 6b is in contact with the pin 5 and eventually fast the measurement ruler 7 on the radial ruler 6 putting the first side 8 in abutment against the trailing edge 2. In this condition, the operator checks the alignment of the reference mark 13 with respect to the lines 60. For alignment it is intended that one of the lines 60 and the reference mark 13 form a rectilinear segment. As shown in the figure, measurement ruler 7 is not in contact with the hub 3, but there is a portion of blade 1b between the measurement ruler 7 and the hub 3.

In the figure, the blade 1 has a radial stacking angle. As shown in the enlarged view B, this condition can be easily recognized by the misalignment between the reference 13 and the line 60. Thus, the operator is aware that the blade 1 under measurement has a radial stacking angle, the next steps are focused to determine the amount of this angle to adopt the proper correction.

FIG. 7 shows the tool to measure the radial stacking angle in the second position. In this second step the operator has moved the measurement ruler 7 to obtain a quantitative indication of the stacking angle.

The operator has aligned the reference 13 with one of the lines 60. This occurs by moving the measurement ruler 7 according to the direction indicated by the arrow S, that corresponds to the stacking axis of the blade 1. As shown in the enlarged view C, the movement of the measurement ruler 7 can be terminated when the reference 13 is aligned with the line 60. In this case, the movement of the measurement ruler 7 is upward; the portion of blade 2b between the measurement ruler 7 and the hub 3 has slightly increased.

FIG. 8 shows the tool to measure the radial stacking angle still in the second position (as in FIG. 7), but in view of a measurement step.

The operator has to read the stacking angle on the second reference portion 11. In one embodiment, the graduated scale for measuring the radial stacking angle comprises: a first graduated scale 14A, a second graduated scale 14B and a sign reference 14C.

The first graduated scale 14A is adapted to furnish the integer value of the radial stacking angle. The second graduated scale 14B in relation with the first graduated scale 14A and is adapted to furnish the decimal value of the integer radial stacking angle read on the first scale 14a. The sign reference 14C is adapted to furnish the sign of the stacking angle. More particularly, the first graduated scale 14A is realized at a first portion proximal to the hub 3 of the second reference portion 11, the second graduated scale 14B is realized at a second opposite portion distal to the hub 3 of the second reference portion 11, and the sign reference 14C at a central portion, between the first and second portion, of the second reference portion 11. In one embodiment, the first graduated scale 14A is a plurality of parallel segments, inclined of the same angles A1 and A2. Each segment furnishes the integer value of the stacking angle. The central segment (the higher one in figure) corresponds to the value of 0 degrees. The two segments respectively neighbor at the central segment furnish the value of 1 degree (the sign of this angle is indicated by mean of the sign reference 14C, as will be clearer afterwards). The two segments at the opposite ends furnish the value of 2 degrees (the sign of this angle is indicated by mean of the sign reference 14C, as will be clearer afterwards). The second graduated scale 14b furnishes the decimal value of integer part indicated by the first graduated scale 14A. Thus: central segment (the higher one), value of 0 degree. The first two segments neighbor and symmetric with respect to the central segment, indicate the value of 0.5 degrees of the integer value of 0 degrees; thus the total angle measured is 0.5 degrees. The second two segments neighbor and symmetric with respect to the central segment indicate the value of 0.5 degrees of the integer value of 1 degree. Thus the total angle measured is 1.5 degrees. The third two segments at the opposite ends and symmetric with respect to the central segment indicate the value of 0.5 degrees of the integer value of 2 degrees. Thus the total angle measured is 2.5 degrees. In one embodiment, the sign reference 14C comprises a "0" in a central position aligned with the central segments of the first and second graduated scales 14A, 14B. On the left of the "0", there is another sign, indicated with a "+". The symbol "+" indicates that segments on the left of the central segments (both first and second graduated scales 14A, 14B) are positive angles.

On the right of the "0" and opposite with respect to the symbol "+", there is another symbol, indicated with a "−". The symbol "−" indicates that segments on the right of the central segments (both first and second graduated scales 14A, 14B) are negative angles.

In FIG. 8, the reading of the stacking angle occurs in this way: the operator checks which of the segments of the reference 14A is more aligned with the line 60. As shown in the figure, the segment indicated with 14A (the first segment on the left after the central segment) is the one more aligned with the line 60. This segment is on the "+" part with respect to the sign reference 14c. Thus the integer part of the stacking angle is +1 degree. The decimal part is read in a similar way. The operator checks which of the segments of the reference 14B is more aligned with the line 60. As shown in the figure, the segment indicated with 14B (the first segment on the left after the central segment) is the one more aligned with the line 60. Thus the decimal part of the stacking angle is +0.5 degree. The value of the radial stacking angle is thus +1.5 degrees.

In a blade without radial stacking angle, the two central segments are both aligned with one of the lines 60.

The first and second graduated scales 14a, 14b can be realized to measure a large range of radial stacking angles, depending on the construction features of the blade to measure. The resolution of the angle measured can vary accordingly.

In general, the method to measure the radial stacking angle wherein a first component of the tool, in particular a base 6C of the radial ruler 6, is arranged according to a radial direction R, then a second component of the tool, in particular the measurement ruler 7, is arranged according to the stacking direction S of the blade, and finally the relative position of said first and second components is detected, i.e. quantitatively measured.

More in particular, with reference to the figures of the embodiments of the tool, the method comprises the following steps: a) positioning means, i.e. pin 5, to indicate a radial reference; b) putting the first component, i.e. radial ruler 6, in contact with the means to indicate a radial reference; c) putting the second component, i.e. the measurement ruler 7, in contact with the trailing edge or leading edge of the blade; d) sliding radially the second component (7) while in contact with the blade until the setting element (13) on the second component (7) is aligned with one of the reference elements (60) on the first component (6); and e) reading the angle by associating the marker element (14) on the second component (7) with the specific reference element of the first component (6) just aligned with the setting element (13) of the second component (7).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tool to measure the radial stacking angle of a cylindrical blade of an axial flow rotating machine, the blade extending radially outwardly from the surface of a hub, the tool comprising:
   a base configured to indicate a radial direction of the hub;
   a component slidable over the blade and configured to indicate the stacking direction of the cylindrical blade;
   a plurality of reference elements to provide a reference scale;
   a setting element configured to set the position of the component with respect to the base;
   a marker element configured to indicate the magnitude of the angle between the stacking direction and the radial direction using the reference elements;
   wherein the angle corresponds to the radial stacking angle.

2. The tool according to claim 1, further comprising means to indicate a radial reference on the cylindrical blade defining a radial direction passing for the radial reference, and radially align the base to the blade when the means and the base are in contact.

3. The tool according to claim 2, wherein the means to indicate a radial reference comprise a pin connected on the face of the shroud of the blade.

4. The tool according to claim 2, wherein the base is configured to be positioned over the lateral external surface of the hub.

5. The tool according to claim 3, wherein the base is configured to be positioned over the lateral external surface of the hub.

6. The tool according to claim 1, wherein the base is configured to be positioned over the lateral external surface of the hub.

7. The tool according to claim 6, wherein the base comprises two elements configured to be positioned over the hub for aligning the base with a plane orthogonal to the hub rotational axis.

8. The tool according to claim 1, wherein the reference elements are a set of parallel lines drawn on a surface of an elongated body, preferably flat, attached to the base and having a side coincident with the radial direction, wherein the parallel lines are inclined with respect to the radial direction.

9. The tool according to claim 8, wherein the setting element is connected to or integrated in the component, and a measuring position of the tool is reached when the component is slid over the blade till the setting element aligns with one of the reference elements.

10. The tool according to claim 9, wherein the marker element is connected to or integrated in the component, and the magnitude of the angle is indicated by the marker element using the one of the reference elements aligned with the setting element.

11. The tool according to claim 1, wherein the component is configured to be positioned in mating relation with a trailing edge or a leading edge of the blade in order to assist the sliding of the component over the blade.

12. The tool according to claim 1, wherein the marker element comprises a first graduate scale and a second graduate scale one shifted with respect to the other according a predetermined value for indicating the integer and decimal value of the radial stacking angle respectively.

13. A method to measure the radial stacking angle of a cylindrical blade of an axial flow rotating machine using a tool, the blade extending radially outwardly from the surface of a hub, wherein first a component of the tool is arranged according to a radial direction, then a second component of the tool is arranged according to the stacking direction the blade, and finally the relative position of the first and second components is detected.

14. The method according to claim 13, using a tool to measure the radial stacking angle of a cylindrical blade of an axial flow rotating machine, the blade extending radially outwardly from the surface of a hub, the tool comprising:
- a base configured to indicate a radial direction of the hub;
- a component slidable over the blade and configured to indicate the stacking direction of the cylindrical blade;
- a plurality of reference elements to provide a reference scale;
- a setting element configured to set the position of the component with respect to the base;
- a marker element configured to indicate the magnitude of the angle between the stacking direction and the radial direction using the reference elements;
- wherein the angle corresponds to the radial stacking angle, the method comprising:
- positioning the means to indicate a radial reference;
- putting the first component in contact with the means to indicate a radial reference;
- putting the second component in contact with the trailing edge or leading edge of the blade;
- sliding radially the second component while in contact with the blade until the setting element is aligned with one of the reference elements; and
- reading the angle by associating the marker element with the one of the reference elements aligned with the setting element.

15. A cylindrical blade of a rotating machine comprising a shroud, wherein the shroud has at least one hole or at least one pin for receiving means to indicate a radial reference on the cylindrical blade.

* * * * *